United States Patent Office 3,396,136
Patented Aug. 6, 1968

3,396,136
COPOLYMERS OF ALKENYL AROMATIC SULFONIC ACIDS WITH UNSATURATED MONOMERS AND THEIR USE AS THICKENERS FOR NON-POLAR SOLVENTS
Richard T. Dickerson, Midland, Mich., assignor to The Dow Chemical Company, Midland, Mich., a corporation of Delaware
No Drawing. Filed June 14, 1965, Ser. No. 463,920
24 Claims. (Cl. 260—30.6)

The instant application is a continuation-in-part of application Ser. No. 68,156, filed Nov. 9, 1960; now abandoned.

The present invention relates to thickeners for non-polar solvents. It also concerns compositions comprising non-polar solvents and a minor proportion of a metal salt of certain polymeric sulfonic acids.

A principal object of the present invention is to provide novel thickeners and homogeneous thickened compositions comprising non-polar solvents. It is a particular object of the invention to provide thickeners for non-polar solvents that can be formed in situ within the non-polar solvent to be thickened. Another object is to provide thickening agents which are highly effective at relatively low concentrations in achieving a given thickening effect. A further object of the invention concerns providing means for increasing the viscosity of non-polar solvents over wide temperature ranges. A still further object is to provide a chemical reagent for gelling non-polar solvents. Other objects will become manifest hereinafter as the invention is more fully described.

It has been discovered that, in accordance with the invention, non-polar solvents are thickened by incorporating into them, as a solute, a minor proportion of a novel mono- or polyvalent metal salt of a lipophilic, linear polymeric sulfonic acid containing from about 0.05 to about 3 sulfonic acid groups per 100 combined monomer units.

The metal polymeric sulfonates of the invention can be incorporated into the non-polar solvents to be thickened in any convenient manner such as by directly dispersing them into the non-polar solvent. However, it is most advantageous to form the metal salts of the polymeric sulfonic acids in situ within the non-polar solvent to be thickened. In carrying out the invention in the latter manner, a suitable quantity of a lipophilic, polymeric sulfonic acid of the invention is dissolved in the non-polar solvent to be thickened and while therein, brought into and maintained in the presence of an effective quantity of a mono- or polyvalent metal cation or mixture of such cations. An "effective quantity" refers to a metal ion concentration at which significant thickening is obtained. Usually, a significant thickening effect is achieved by incorporating a sufficient amount of the metal ions employed to form at least about 0.05 metal sulfonate groups per 100 combined monomer units in the polymeric sulfonic acid.

The quantities of the metal cation employed and its valence state are important variables having a pronounced influence upon the extent and character of the thickening that is achieved, e.g., increase in viscosity or gelation of the non-polar solvent. Another factor of considerable importance in controlling the thickening effect of the invention is the frequency of occurrence of the sulfonic acid group on the polymeric chain. By manipulation of these variables, it is possible to increase the viscosity of non-polar solvents or to form gels therefrom with small quantities of the metal polymeric sulfonates of the invention over wide temperature ranges.

Hereinafter, for the purposes of this specification and appended claims, the terminology "non-polar solvent" shall comprehend the group of non-polar organic solvents consisting of aliphatic and aromatic hydrocarbons, halogenated aromatic hydrocarbons and halogenated aliphatic hydrocarbons. Also within the group of operable non-polar solvents for the purposes of the invention are carbon disulfide, mononitro-substituted aromatic hydrocarbons, trialkyl and triaryl phosphates and alkyl and aryl thioethers. Mixtures composed of a major proportion of one or more materials of the foregoing classes of solvents are also within the meaning of non-polar solvent.

The scope of operable non-polar organic solvents is further delineated by means of the solvent solubility parameter as defined by Hildebrand and Scott, The Solubility of Nonelectrolytes, 3rd edition, American Chemical Society, Reinhold Publishing Corp., New York, N.Y. (1950). On page 435 of their book, these authors refer to the portions of their book in which the term "solubility parameter" is defined and then proceed to list solubility parameters for selected materials. Pursuant to the solubility parameters reported therein, the class of non-polar solvents operable in the present invention has a solubility parameter range up to about 10.5 at 25° C. This solubility parameter generally correlates with other work reported in the field of solvent characterization which employs the terminology "cohesive energy density" as a parameter of solvent strength, according to the equation:

Solubility Parameter (Hildebrand et al.)
$$= \sqrt{\text{Cohesive energy density}}$$

Specific examples of solvents that are operable are aliphatic hydrocarbons such as liquified propane and butane, pentane, hexane, cyclohexane, heptane, octane and decane. Aromatic hydrocarbons include benzene, toluene, ethylbenzene, xylene, propylbenzene, naphthalene, mesitylene, styrene, ar-methylstyrene, tetralin and the essentially aliphatic and/or aromatic hydrocarbons that can be obtained, for example, as crude petroleum or distillation cuts from petroleum stocks and coal oils. Examples are gasoline, kerosine, ligroin, and lubricating oils. Various halogonated aliphatic and aromatic materials that can be effectively thickened in accordance with the present invention include methyl chloride, methylene chloride, carbon tetrachloride, methyl bromide, methyl iodide, ethyl chloride, ethyl bromide, ethyl iodide, 1,2-dichloroethane, 1,2-dibromoethane, 1,1,1-trichloroethane, 1,2-dichloroethylene, propylene chloride, amyl chloride, chlorobenzene, dichlorobenzene, trichlorobenzene, tetrachlorobenzene, hexachlorobenzene, chlorotoluene, bromotoluene, chloroethylbenzene and the like materials. Additional non-polar solvents that are operable are the mononitro aryls such as nitrobenzene, nitrotoluene and the like materials; the alkyl and aryl thioethers such as diethylsulfide, dimethylsulfide, methyl ethyl sulfide, diphenyl sulfide, methyl phenyl sulfide and the like materials and the triaryl and trialkyl esters of phosphoric acid such as triethylphosphate, tricresylphosphate and the like.

Most of the above-specified organic non-polar solvents are liquid at room temperature. Liquidity at normal room temperatures, however, is not a requirement for operability as good results can be obtained in accordance with the present invention in melts of solids that are obtained at temperatures below that temperature which is the upper limit of thermostability of the metal polymeric sulfonate that is employed. The invention is most useful as applied to solvents which exist as liquids below about 100° C. Good results are also obtained when the non-polar solvent is gaseous or readily vaporized at normal room temperatures and must either be pressurized or cooled, or both, to maintain it in a liquid state.

The metal polymeric sulfonates of the invention correspond to certain addition copolymers containing in polymerized form from about 0.05 to about 3 monomer units per 100 combined monomer units of an alkenyl aromatic sulfonate having the formula $$CH_2=\overset{R}{\underset{|}{C}}-Ar-SO_3M$$

wherein Ar is a divalent radical selected from the group consisting of aromatic hydrocarbon radicals of the benzene series and having from 6 up to 18 carbons and nuclear halogenated derivatives of such aromatic hydrocarbon radicals, said divalent radical having its valence bonds on nuclear carbon atoms, R is a member of the group consisting of hydrogen and methyl and M is a metal cation.

The polymeric sulfonic acids that are employed in the present invention to form metal polymeric sulfonates are non-crystalline, lipophilic, i.e., oil soluble, linear polymers. Their molecular weights are not critical, but the higher the polymer molecular weights, the greater effect of the invention. Preferably, the weight average molecular weight of the polymeric acid is at least about 100,000. As employed herein, the term "linear" refers to the absence of substantial cross-linking between polymer chains but does not preclude the inclusion of graft copolymers or branched linear polymers. Essential requisites for operability of the polymeric sulfonic acids are that they be miscible with the non-polar solvent to be thickened and contain from about 0.05 to about 3 pendant sulfonic groups per 100 combined monomer units. Such polymeric acids comprise relatively few polar or hydrophilic foci such as amine, amide, carbonyl or ether linkages, or such substituents as hydroxyl or oxy-acid groups in addition to the required free sulfonic acid groups that are not offset by large hydrocarbon groups attached thereto which render the resulting combination lipophilic or oil soluble. Miscibility can be ascertained by simply stirring a small quantity of about 5 to 10 percent by weight or so of the polymeric acid into the non-polar solvent to be thickened and observing whether or not a visually continuous solution is obtained. The polymeric sulfonic acids must also be characterized by an average degree of polymerization of at least about 70 to about 4000 monomer units per polymer molecule, depending upon the minimum degree in the range, that is sufficient to provide an average of at least about 2 sulfonic acid groups per polymer molecule.

A special class of polymeric sulfonic acids comprises copolymers of the indicated sulfonic monomers with lipophilic monomers copolymerizable therewith, of which lipophilic monomers a major proportion is at least one monoethylenically unsaturated hydrocarbon monomer of the benzene series having from 10 to 18 carbons. Such copolymers preferably contain from about 0.05 up to about 1.5 of the sulfonic moieties per 100 combined monomer units. The salts of these polymers are most useful in aliphatic or paraffinic hydrocarbons.

The metal cations that are employed to form the polymeric sulfonic acid salts are the mono-, di- and trivalent ions of metals that form salts with at least one of the strong mineral acids such as hydrochloric, sulfuric, nitric and chloric acids, with such salts being ionizable to provide ions that are not subject to spontaneous oxidation or reduction in aqueous media.

The above described polymeric sulfonic acid starting materials can be prepared, for example, by polymerizing ethylenically unsaturated lipophilic monomers with a suitable proportion of an alkenyl aromatic sulfonic acid or an alkenyl aromatic monomer that can be subsequently sulfonated to provide the desired frequency of sulfonic acid groups throughout the polymer.

It is most convenient, however, to prepare the polymeric sulfonic acids of the invention by directly sulfonating a linear, non-crystalline, lipophilic polymer containing in chemically combined form a sufficient number of sulfonatable aromatic groups to permit sulfonation to a degree of at least about 0.05 sulfonate groups per 100 combined monomer units. Preferred sulfonatable polymers are prepared from vinyl aromatics wherein at least one of the ring carbon atoms of the aromatic monomer is sulfonatable by virtue of the fact that it has a displaceable hydrogen atom. Such sulfonatable aromatic groups have the general formula $$CH_2=\overset{R}{\underset{|}{C}}-Ar$$

wherein Ar is a monovalent aromatic hydrocarbon of the benzene series having from 6 to 18 carbons, or a nuclearly halogenated hydrocarbon radical, having its valence bond on a carbon atom of the sulfonatable aromatic nucleus, and R is hydrogen or a methyl radical. Examples of such monoalkenyl aromatic compounds are styrene, α-methyl styrene, ar-methyl styrene, ar-dimethyl styrenes, ar-trimethyl styrenes, ar-ethyl styrenes, ar-propyl styrenes, ar-t-butyl styrene, ar-amyl styrene, ar-hexyl styrene, ar-decyl styrene and ar-dodecyl styrene, ar-chloro styrenes, ar-dichloro styrenes, ar-bromo styrenes, and the like compounds.

The polymeric sulfonic acids of the invention may also contain monomers, in addition to the sulfonatable alkenyl aromatic compounds comprising one or more lipophilic, ethylenically unsaturated monomers which may be either aliphatic or cycloaliphatic. Examples of such lipophilic monomers are propylene, butylene, vinyl cyclohexane, butadiene, isoprene, 2,3-dimethylbutadiene, chloroprene and the like mono- and diolefins which polymerize to form an essentially linear, soluble polymer.

Other lipophilic monomers are ethylenically unsaturated organic materials which, while containing hydrophilic foci such as, for example, ether, carbonyl or amine groups or such substituents as hydroxyl or oxy-acid groups, are sufficiently lipophilic by virtue of large hydrocarbon portions thereof, to provide, when polymerized, lipophilic, i.e., oil-soluble polymers. Examples of the latter materials are the vinyl esters of aliphatic and aromatic acids such as vinyl butyrate and vinyl benzoate, respectively, alkyl esters of acrylic and substituted acrylic acids such as ethyl acrylate and ethyl methacrylate, respectively, and the like materials.

The polymeric sulfonic acids can be prepared with known sulfonation reagents. For example, the described sulfonatable polymers can be subjected to the action of concentrated or fuming sulfuric acid, chlorosulfonic acid, or sulfur trioxide and the like, to achieve an average degree of sulfonation that is sufficient to provide from about 0.05 to about 3 sulfonic acid groups per 100 combined monomer units. Usually the polymers to be sulfonated are dispersed in an organic solvent inert to the sulfonating reagent and, after sulfonation, recovered from the reaction mass by precipitation with a non-solvent such as methanol or acetone. It is to be understood that the term "average degree of sulfonation," as employed herein, comprehends some sulfonation throughout the polymer mass.

Whether mono- or polyvalent metal cations are employed to form the polymeric sulfonates varies according to the particular thickening effect desired. The monovalent metal salts of the polymeric sulfonic acids provide an especially advantageous and sensitive means for increasing and controlling the viscosity of the above-described non-polar solvents. The polyvalent metal polymeric sulfonates have a more pronounced thickening effect and provide means of gelling non-polar solvents.

Monovalent alkali metal-derived cations such as those obtained from lithium, sodium, potassium and the like are employed in the invention when controlled increases in viscosity of non-polar solvents are desired. The polyvalent metal cations of which representative examples are the alkaline earth metals such as calcium, barium, magnesium and the like and such other polyvalent metals as zinc, iron, copper, lead and aluminum are employed to form gels or very viscous solutions. In all instances, i.e., with both the mono- and polyvalent cations, the thickening action of the metal polymeric sulfonates is reversible. This means that the solvent can be separated from the polymeric acid salt and that the same polymeric material can then be redissolved in the same or another suitable non-polar solvent to achieve a thickening effect. Although it is possible to first prepare the polymeric sulfonic acid salts and then dissolve them in the non-polar solvent to be thickened, to achieve a particular thickening effect, the in situ formation of the salts permits better control of the resulting thickening effect. Also thickening is obtained at an equilibrium state much more quickly when the salts are formed in situ.

The alkali polymeric sulfonates of the invention can be prepared in situ by contacting the polymeric sulfonic acid in a non-polar solvent solution thereof with an alkali metal oxide or alkali metal hydroxide. For example, having first prepared a solution of a suitable quantity of a polymeric sulfonic acid in the non-polar solvent to be thickened, an aqueous solution of the particular alkali hydroxide being employed is thoroughly mixed into the non-polar solvent solution with sufficient agitation to form a water-in-oil emulsion. In this manner, the dissolved polymeric sulfonic acid is sufficiently contacted with the alkali metal cations to result in the in situ formation of the thickening salts. Since water is generally undesirable in the ultimately thickened composition, it is desirable to utilize a highly concentrated aqueous solution of the alkali metal hydroxide that is employed.

It has been discovered that in the practice of the invention, exceptional results can be obtained in accordance with the following method for forming the metal polymeric sulfonates in situ within the non-polar solvent to be thickened.

As in the above-described procedure, it is preferred to first prepare a solution of the polymeric sulfonic acid in the non-polar solvent. A metal salt which is soluble in, and preferably dissolved in part of the solvent to be thickened, and which comprises the metal cation in combination with the conjugate anion of an organic acid weaker than the polymeric sulfonic acid is then added to the non-polar solvent solution of the polymeric sulfonic acid in an amount sufficient to cause a desired increase in the solution's resistance to flow. The above term "weaker" means that the anion of the weak organic acid must have the ability to deprotonate the pendant sulfonic acid groups of the polymeric sulfonic acid. The term "acid" is employed in the foregoing in the broad sense as including those compounds capable of having a hydrogen atom replaced by a metal atom.

It should be noted that the order in which the polymeric sulfonic acid and the metal salt of the weak organic acid are added to the non-polar solvent to be thickened is not critical. Any convenient means of achieving such a solution may be employed, which includes adding either or both of the reactants to the non-polar solvent to be thickened as powders, or in a solution miscible with the non-polar solvent.

Weak organic acids that can be employed include the oil-soluble alkanols, alkylcarbonates, alkyl and aryl sulfites, fatty acids and the like weak organic acids that do not form a stable complex with the metal ion being employed as would, for example, a chelating agent, e.g., acetylacetone. Generally, alkyl chains of at least about 4 carbon atoms are needed to impart the necessary oil solubility to the foregoing weak organic acids. However, it is preferred that such alkyl chains contain 8 or more carbon atoms. Specific examples of operable weak organic acids are octanol, 2-octylcarbonic acid, methylcarbonic acid, dodecylcarbonic acid, octyl mercaptan, 2-octylsulfurous acid and phenylsulfurous acid.

Weak organic acids that have been found to be highly effective in the invention are the alkyl-substituted phenols such as, for example, tertiary-butylphenol, octylphenol, dodecylphenol and the like. Alkali metal alkylphenolates can be prepared by mixing stoichiometric quantities of the metal, metal oxide, hydroxide or alcoholate with the alkylphenol in a solvent such as a lower alkanol. Certain other alkylphenolates such as those of magnesium can be prepared by reacting a metal alkoxide such as magnesium methoxide with the desired alkylphenol in the presence of an alkanol solvent. Alkylphenolates of most other metals such as those of copper, iron and lead can be prepared by a metathetical reaction in a solvent such as a lower alkanol between a salt of the metal, such as the chloride or bromide salts, and an alkali metal alkoxide. The alkali metal salt by-product of this reaction, e.g., the corresponding chloride or bromide, being insoluble in the lower alkanol solvent, precipitates leaving the desired phenolate in solution.

The solvent is separated from the above-described reaction products by evaporation and the residue comprising the metal alkylphenolate is dissolved in a non-polar solvent, preferably the solvent that is to be thickened. This solution is then filtered and made up to desired concentrations which can be determined, when precise control of this variable is desired, by simple volumetric titration with a standard acid.

The thickened non-polar solvent that is obtained in accordance with the foregoing procedure does not contain incorporated water or other impurities such as excess hydroxides or metal oxides which may result from entrainment in the previous method involving direct in situ treatment of the polymeric polysulfonic acid with an aqueous hydroxide solution or a metal oxide. Other advantages of this method concern the precise control that can be obtained over the amount of metal cation that is in solution or, in effect, the extent of salt formation occurring in the dissolved polymeric sulfonic acid. The latter factor has a considerable bearing on the exact viscosity that is obtained and provides a conventient means for controlling the viscosity or gel formation.

The quantity of the metal cation incorporated into the non-polar solvent solution of the polymeric sulfonic acid is sufficient to achieve a chemical equivalence ratio, i.e., ratio of chemical equivalents of the metal cations for each chemical equivalent of sulfonic acid groups, that may range from about 0.05 to about 5.0 or more for effective results. The invention is often still operable above an equivalence ratio of 50 but the polymer may tend to become insoluble in the solvent in which event the thickening effect achieved is substantially less than the maximum effect obtained at a lower equivalence ratio. Parameters, which most strongly affect the optimum equivalence ratio, are the polymer molecular weight and degree of sulfonation. The actual equivalence ratio employed is usually determined by the thickening effect desired. Often a maximum thickening effect is accomplished within the range of equivalence ratios of about 0.9 to about 8.

In most applications, the desired thickening effect in the non-polar solvent can be achieved using a concentration of about 0.5 to 10 weight percent of the metal polymeric sulfonate based on the weight of the non-polar solvent, but as may be desired, effective thickening can be achieved with quantities of the polymeric acid, with high molecular weight polymers, using as little as about 0.05 weight percent, based on the weight of the solvent. Depending upon the polymer that is employed, the frequency of pendant free sulfonic acid groups in the polymer, the particular metal cation that is contracted with the polymer in solution and the equivalence ratio of the metal cations to sulfonic acid groups, a thickening effect is achieved which can vary from a substantial increase in the viscosity of the non-polar solvent to the formation of a gel which is stable over wide temperature ranges.

The metal polymeric sulfonates of the invention are highly effective thickeners for non-polar solvents of the previously specified classes. Such solvent and thickener combinations can be employed to great advantage in compositions where viscosity control or gelation of the non-polar solvent phase is desired. Examples of such applications are in certain explosive compositions, fuels, pigment coatings and lacquer coatings wherein viscosity control is important and in hand soaps, explosives and lubricants wherein gelation or viscosity index improvement may be desired for effective operation. The thickeners are also highly useful for improving the persistence of pesticides and fungicides which may, themselves, be of the nature of non-polar solvents or applied in non-polar solvents.

The following examples are given as further illustrations of the present invention but the invention should not be considered as being limited thereto.

Example 1

To 90 grams of dry methylene chloride was added 10 grams of polystyrene and to the resulting solution was added at about 25° C. with good agitation, 0.15 gram of 95 percent sulfuric acid and 0.5 gram of acetic anhydride. The resulting mixture was agitated sufficiently to render it homogeneous and then allowed to stand for 24 hours at room temperature. The reaction mixture was then poured into about 1500 milliliters of strongly agitated methanol in order to precipitate the polymer. The precipitated polymer was recovered by vacuum filtration and washed twice with methanol. It was then dried and analyzed. The analysis indicated the presence of about 1 percent sulfonic acid groups by weight of the polymer.

Lithium dodecylphenolate was prepared by dissolving lithium hydroxide in ethanol and adding a chemical equivalent of dodecylphenol to the resulting solution. The ethanol and water of reaction derived from the reaction between the hydroxide and the dodecylphenol was removed from the reaction mixture by evaporation leaving thereby a residue of lithium dodecylphenolate. This residue was dissolved in toluene and the resulting solution filtered. The exact concentration of the lithium dodecylphenolate was determined by volumetric titration.

Solutions of the above-prepared polymeric sulfonic acid were prepared in toluene. Lithium dodecylphenolate was added to these solutions thereby achieving a thickening effect. The quantities of the ingredients and the thickening results as measured by means of a Brookfield viscometer was reported in Table 1.

TABLE 1

| Percent Polymer In Solution | $Li^+:SO_3$ (Chemical Equivalence) | Viscosity (Centipoises) |
| --- | --- | --- |
| 5 | 1 | [1] 300,000 |
| 5 | 3 | 2,000 |
| 5 | 5 | 250 |
| 2.5 | 0.5 | 130 |
| 2.5 | 0.75 | 1,200 |
| 2.5 | 1.0 | 2,600 |
| 2.5 | 1.5 | 2,600 |
| 2.5 | 2.0 | 700 |

[1] (Estimated).

Note that variables affecting the rate of shear within the liquid being tested for its viscosity, such as the distance of the liquid surface from the spindle surface, spindle diameter and the speed thereof, influence the ratings that are obtained. The values reported in Table 1 are average results obtained by the use of different spindles except in those instances where constant results were obtained with all spindle sizes. It should also be further noted that since large changes in viscosity, as effected by the present invention, can be attributed to rather small variances in concentrations of the metal cations, sulfonic acid groups and amount of polymeric acid present, small experimental errors can cause rather wide scattering in test data.

Example 2

Additional solutions of the polymeric sulfonic acid of Example 1 were prepared in various solvents as specified in the following Table 2. Sufficient quantities of lithium dodecylphenolate also prepared as in Example 1 were incorporated into these solutions to provide a chemical equivalence ratio of 1.2 lithium ions per sulfonic acid group. The viscosities of the resulting thickened compositions were measured with a Brookfield viscometer. The results are compared in Table 2 with the initial viscosity solution prior to the addition of the metal cation.

TABLE 2

| Solvent | Original Solution Viscosity (Centipoises) | Viscosities With $Li^+$ (Centipoises) |
| --- | --- | --- |
| Carbon Tetrachloride | 5 | [1] |
| Tricresyl phosphate | 13 | 27 |
| o-Dichlorobenzene | 1.5 | 2,000 |
| Nitrobenzene | 0.5 | 100 |

[1] About 3000,000.

Example 3

A number of polymeric sulfonic acids were prepared by lightly sulfonating a series poly-t-butyl-styrenes (PBS) of different molecular weights. In each preparation, the polymer was dispersed in methylene chloride to provide a conveniently stirred solution. Chlorosulfonic acid was added dropwise, as a 1% by volume solution in methylene chloride, to the vigorously stirred polymer solution. After addition of a desired amount of the sulfonating reagent, the polymer was recovered by precipitation with methanol and filtering the reaction system.

Data pertinent to each preparation are set forth in the following table:

| Polymer | PBS Mol. Wt., million | Sulfur, Wt. percent | Degree of Sulfonation [1] |
| --- | --- | --- | --- |
| A | 0.15 | 0.25 | 0.0125 |
| B | 0.88 | 0.14 | 0.007 |
| C | 10 | 0.06 | 0.003 |
| D | 13 | 0.16 | 0.008 |

[1] The fraction of monomer units which bear sulfonic substitution.

To prepare homogenous thickened compositions using known equivalence ratios of metal cations, a number of metal salts of acids weaker than sulfonic acid were prepared as dilute solutions in toluene. Such metal salts included potassium and lithium nonylphenoxides. The potassium salt was prepared by dissolving the hydroxide of the metal in methanol and adding nonylphenol. The methanol was removed by evaporation leaving a residue of the desired salt. The lithium salt was prepared in a similar manner, except that lithium metal was used in place of the hydroxide.

Other oil soluble metal compounds were prepared as reaction products of oleic acid. Particularly potassium and magnesium oleate were prepared in a manner similar to that used above to prepare the metal nonylphenoxides. Calcium oleate was prepared by reacting calcium chloride with oleic acid in aqueous solution.

All of the metal salts of weak acids were dissolved in toluene and titrated with HCl to determine their normality based on metal ion.

The sulfonated polymers were dissolved in heptane to give solutions having polymer contents ranging from 5% down to 0.5%. To aliquots of these solutions were added the metal cation compounds to provide known metal cation equivalents based on available sulfonic moieties. The viscosities of the resulting solutions were measured using a Brookfield viscosimeter. Representative thickening results are set forth in the following table:

TABLE 4

| Polymer Type | Polymer Concentration (Weight Percent) | Nonylphenoxide Additives ||||| Oleate Additives |||||||
|---|---|---|---|---|---|---|---|---|---|---|---|---|
| | | Lithium || Potassium || Potassium || Magnesium || Calcium ||
| | | Equiv. Ratio | Viscosity (cps.) | Equiv. Ratio | Viscosity (cps.) | Equiv. Ratio | Viscosity (cps.) | Equiv. Ratio | Viscosity (cps.) | Equiv. Ratio | Viscosity (cps.) |
| A | 5 | 0 | 5 | 0 | 5 | 0.0 | 5 | 0.0 | 5 | 0.0 | 5 |
| | | 0.3 | 5 | 0.25 | 6 | 1.0 | 5 | 0.5 | 7 | 1.0 | 5 |
| | | 1.0 | 6 | 1 | 7 | 2.0 | 34 | 1.0 | 20 | 2.0 | 13 |
| | | 2.0 | 74 | 2 | 1,700 | 2.5 | 20 | 2.0 | 44,900 | 4.0 | 26 |
| | | 3.0 | 3,360 | 3 | 3,600 | 3.0 | 16 | 4.0 | 1,230 | | |
| | | 6.0 | 8,200 | 6 | 2,000 | 5.0 | 25 | 6.0 | 120 | | |
| | | 8.0 | 1,830 | 8 | 8,200 | | | | | | |
| | | 10.0 | 120 | 10 | 650 | | | | | | |
| B | 2 | | | 0.0 | 1 | | | 0.0 | 1 | | |
| | | | | 0.4 | 3 | | | 0.4 | 1,680 | | |
| | | | | 0.6 | 2,000 | | | 0.5 | 1,190 | | |
| | | | | 1.2 | 1,500 | | | 0.7 | 740 | | |
| | | | | 2.0 | 1,300 | | | 0.9 | 250 | | |
| | | | | 3.9 | 5 | | | 1.1 | 60 | | |
| | | | | | | | | 1.4 | 10 | | |
| | | | | | | | | 3.5 | 4 | | |
| B | 1 | | | 0.0 | 1 | | | 0.0 | 1 | | |
| | | | | 0.8 | 25 | | | 0.7 | 27 | | |
| | | | | 1.2 | 1 | | | 1.1 | 10 | | |
| | | | | | | | | 1.4 | 1 | | |
| C | 2 | | | 0.0 | 3,200 | | | 0.0 | 3,200 | | |
| | | | | 0.8 | 4,600 | | | 1.4 | 3,800 | | |
| | | | | 3.1 | 100,000 | | | 2.8 | 100,000 | | |
| | | | | 4.7 | 100,000 | | | 4.2 | 100,000 | | |
| | | | | 6.3 | 42,000 | | | 7.0 | 100,000 | | |
| | | | | 7.9 | 9,000 | | | 9.8 | | | |
| | | | | 8.6 | 30,000 | | | | | | |
| | | | | 9.4 | 33,000 | | | | | | |
| | | | | 11.0 | 100,000 | | | | | | |
| C | 1 | | | 0.0 | 40 | | | 0.0 | 40 | | |
| | | | | 1.6 | 110 | | | 1.4 | 95 | | |
| | | | | 3.1 | 1,100 | | | 2.8 | 800 | | |
| | | | | 4.7 | 600 | | | 4.2 | 2,250 | | |
| | | | | 6.3 | 200 | | | 7.0 | 90,000 | | |
| | | | | 9.4 | 380 | | | 11.3 | 65,000 | | |
| | | | | 12.6 | 2,500 | | | 12.55 | 25,000 | | |
| | | | | 15.7 | 35,000 | | | 14.0 | 4,500 | | |
| | | | | 20.4 | 15,000 | | | 19.6 | 3,000 | | |
| | | | | 25.2 | 1,500 | | | | | | |
| C | 0.5 | | | 0.0 | 2 | | | 0.0 | 2 | | |
| | | | | 18.9 | 2 | | | 2.8 | 5 | | |
| | | | | 22.0 | 35 | | | 11.3 | 12 | | |
| | | | | 28.3 | 10 | | | 16.8 | 1,200 | | |
| | | | | 44.0 | 5 | | | 33.6 | 100 | | |
| | | | | | | | | 45.2 | 20 | | |
| D | 1 | | | 0.0 | 12 | | | | | | |
| | | 0.0 | 12 | | | 0.0 | 12 | 0.0 | 12 | 0.0 | 12 |
| | | 0.2 | 520 | 0.3 | 16,500 | 0.3 | 900 | 0.4 | 8,000 | 0.4 | 28 |
| | | 0.4 | 14,000 | 0.6 | 100,000 | 0.6 | 16,000 | 0.5 | 320 | 1.0 | 1,600 |
| | | 1.0 | 40 | 2.2 | 40 | 2.2 | 14,000 | 2.0 | 200 | 2.0 | 500 |
| | | 5.2 | 100 | 4.4 | 120 | 4.4 | 400 | 20.0 | 8,000 | 4.0 | 80 |
| | | 10.4 | 3,500 | 5.5 | 4,400 | 5.5 | 2,000 | 29.4 | 5,000 | 10.2 | 12,000 |
| | | 20.8 | 6,000 | 11.0 | 4,700 | 11.0 | 12,000 | | | 20.4 | 7,000 |
| | | | | 22.0 | 50 | 22.0 | 50 | | | 30.6 | 400 |
| D | 0.5 | | | | | | | 0.0 | 2 | | |
| | | 0.0 | 2 | | | 0.0 | 2 | | | 0.0 | 2 |
| | | 0.1 | 380 | | | 0.1 | 2,000 | 0.0 | 120 | 0.1 | 1,000 |
| | | 0.1 | 2,200 | | | 0.1 | 3,000 | 0.1 | 5,000 | 0.1 | 4,500 |
| | | 0.2 | (¹) | | | 0.2 | (¹) | 0.14 | (¹) | 0.2 | (¹) |

¹ Phase separation.

The above data evidences the facts that optimum thickening will vary depending upon the type of cation used, the form in which the cation is incorporated into the polymer solution, the equivalence ratio of the cation to sulfonic groups, the degree of sulfonation of the polymer, and the concentration of dissolved polymer.

As a general rule, the compositions having an optimum equivalent ratio of cations to sulfonic groups, as evidenced by the attainment of a maximum viscosity, are visually homogeneous, viscous or gelled, solutions. Over certain ranges of cation to sulfonic group ratios, the polymers may tend to separate from solution as evidenced by the solution taking on an applesauce-like consistency. In such event, useful thickening is achieved, but should a more homogeneous product be desired, the equivalent ratio of cations to sulfonic groups, or the amount of polymer in solution, may be adjusted.

The use of a polymer having a lower molecular weight or having a lower degree of sulfonation will also help to reduce phase separation. A cation added as the salt of a very weak acid, such as a phenol, is more effective than when added as a salt of a stronger acid, such as a carboxylic acid. A cation may be introduced in the form of an aqueous solution of its hydroxide, but this technique introduces a discontinuous phase.

In addition to achieving a general thickening effect, the experimental evidence indicates the thickened compositions to be comparatively insensitive to permanent change by shearing forces. Sometimes, however, a dilatant effect is observed, i.e., the viscosity of the solution increases with time as a result of the shear gradient introduced by the viscometer. Removing the shear gradient allows restoration of the original state. Dilatancy is most pronounced in solutions of polymers of high molecular weight, e.g., above 1 million or so.

In a manner similar to that of the foregoing examples, other non-polar solvents having solubility parameter at 25° C. up to about 10.5 selected from a group consisting of aliphatic hydrocarbons, aromatic hydrocarbons, halogenated aromatic hydrocarbons, halogenated aliphatic hydrocarbons, mononitro-substituted aromatic hydrocarbons, triaryl and trialkyl phosphates, aryl and alkyl thioethers and mixtures of solvents composed of a major proportion of one or more materials of the foregoing classes are thickened to a comparable extent by incorporating into them and compositions comprising such solvents a thickening quantity within the range of about 0.05 up to 10 percent by weight of a lipophilic, polymeric sulfonic acid containing from about 0.05 to about 3 sulfonic acid groups per 100 combined monomer units and sufficient metal cation such as sodium, potassium, cesium, rubidium, calcium, magnesium, copper, lead, zinc and iron derived mono-, di- and trivalent cations to cause thickening of the solvent. Solvents thus thickened, either individually or in mixtures, include liquefied propane and butane, pentane, hexane, octane, dodecane, benzene, toluene, ethylbenzene, xylene, propylbenzene, naphthalene, mesitylene, styrene, ar-methylstyrene, tetralin, methyl chloride, methylene chloride, carbon tetrachloride, methyl bromide, methyl iodide, ethyl chloride, ethyl bromide, ethyl iodide, 1,2-dichloroethane, 1,2-dibromoethane, 1,1,1-trichloroethane, 1,2-dichloroethylene, propylene chloride, amyl chloride, chlorobenzene, dichlorobenzene, trichlorobenzene, tetrachlorobenzene, hexachlorobenzene, chlorotoluene, bromotoluene, chloroethylbenzene, nitrobenzene, nitrotoluene, carbon disulfide, diethylsulfide, dimethylsulfide, methyl ethyl sulfide, diphenylsulfide, methyl phenyl sulfide, triethylphosphate, tricresylphosphate and the like.

What is claimed is:

1. A lipophilic, linear copolymer of an alkenyl aromatic sulfonic acid monomer and a lipophilic, ethylenically unsaturated monomer copolymerizable therewith, said copolymer containing from about 0.05 to about 3 alkenyl aromatic sulfonic acid groups in polymerized form per 100 combined monomer units, said alkenyl aromatic sulfonic acid monomer having the formula:

wherein Ar is a divalent radical selected from the group consisting of aromatic hydrocarbon radicals of the benzene series and nuclear halogenated aromatic hydrocarbon radicals of the benzene series, said divalent radicals having from 6 to 18 carbons and their valence bonds on nuclear carbon atoms, and R is a member of the group consisting of hydrogen and methyl and said lipophilic, ethylenically unsaturated monomer having the formula:

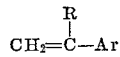

wherein Ar is a monovalent radical selected from the group consisting of aromatic hydrocarbon radicals of the benzene series and nuclear halogenated aromatic hydrocarbon radicals of the benzene series, said radicals having from 6 to 18 carbons and their valence bonds on nuclear carbon atoms, said copolymer being characterized by a degree of polymerization sufficient to provide an average of at least about 2 sulfonic acid groups per polymer molecule.

2. A metal salt of the copolymer acid of claim 1 wherein the metal salt-forming ion is selected from the group consisting of mono-, di- and trivalent ions of metals that form salts with at least one of the mineral acids selected from the group consisting of hydrochloric, sulfuric, nitric and chloric acids, which salts are ionizable to provide metal ions that are not subject to spontaneous oxidation or reduction in aqueous media.

3. A lipophilic, linear copolymer of an alkenyl aromatic sulfonic acid monomer with an ethylenically unsaturated aromatic hydrocarbon monomer copolymerizable therewith of the benzene series having from 10 to 18 carbons, said copolymer containing in polymerized form from about 0.05 to about 1.5 of the sulfonic acid bearing monomers per 100 combined monomer units, said alkenyl aromatic sulfonic acid monomer having the formula:

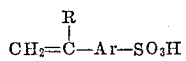

wherein Ar is a divalent radical selected from the group consisting of aromatic hydrocarbon radicals of the benzene series and nuclear halogenated aromatic radicals of the benzene series, said divalent radicals having from 6 to 18 carbons and their valence bonds on nuclear carbon atoms and R is a member of the group consisting of hydrogen and methyl, and said polymer being characterized by a degree of polymerization sufficient to provide an average of at least about two sulfonic acid groups per polymer molecule.

4. A metal salt of the copolymer acid of claim 3 wherein the metal salt-forming ion is selected from the group consisting of mono-, di- and trivalent ions of metals that form salts with at least one of the mineral acids selected from the group consisting of hydrochloric, sulfuric, nitric and chloric acids, which salts are ionizable to provide metal ions that are not subject to spontaneous oxidation or reduction in aqueous media.

5. A copolymer as in claim 3 having a weight average molecular weight of at least 1 million.

6. Poly-tertiary-butylstyrene in which from about 0.05 up to about 1.5 mole percent of the polymerized monomers bear a sulfonic acid group.

7. A composition of matter comprising (A) a nonpolar organic solvent having a solubility parameter up to about 10.5 at 25° C. selected from the group consisting of aliphatic hydrocarbons, aromatic hydrocarbons, halogenated aromatic hydrocarbons, halogenated aliphatic hydrocarbons, mono-nitro-substituted aromatic hydrocarbons, alkyl and aryl thioethers, carbon disulfide, trialkyl and triaromatic esters of phosphoric acid and mixtures of organic solvents consisting of a major proportion of at least one solvent of the foregoing classes of nonpolar organic solvents, and (B) dissolved in the solvent, a thickening quantity within the range from about 0.05 up to about 10 percent by weight of the solvent of a metal salt of a lipophilic, linear, copolymer of an alkenyl aromatic sulfonic acid monomer and a lipophilic, ethylenically unsaturated monomer copolymerizable therewith, said copolymer containing in polymerized form from about 0.05 to about 3 of the sulfonic monomers per 100 combined monomer units, said alkenyl aromatic sulfonic acid monomer having the formula:

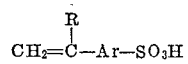

wherein Ar is a divalent radical selected from the group consisting of aromatic hydrocarbon radicals of the benzene series and nuclear halogenated aromatic hydrocarbon radicals of the benzene series, said divalent radicals having from 6 to 18 carbons and their valence bonds on nuclear carbon atoms, and R is a member of the group consisting of hydrogen and methyl, and said copolymer being characterized by an average degree of polymerization sufficient to provide an average of at least about 2 sulfonic groups per polymer molecule; in which salt of the copolymer the metal cation is selected from the group consisting of mono-, di- and trivalent ions of metals that form salts with at least one of the mineral acids selected from the group consisting of hydrochloric, sulfuric, nitric and chloric acids, which salts are ionizable to provide metal ions that are not subject to spontaneous oxidation or reduction in aqueous media.

8. A composition of matter as in claim 7 wherein the metal salts of the copolymer is an alkali metal salt.

9. A composition of matter as in claim 7 wherein the metal salt of the copolymer is an alkaline earth metal salt.

10. A composition of matter as in claim 7 wherein the metal salt of the copolymer is a zinc salt.

11. A composition of matter as in claim 7 wherein the metal salt of the copolymer is a copper salt.

12. A composition of matter as in claim 7 wherein the metal salt of the copolymer is a lead salt.

13. A composition of matter as in claim 7 wherein the metal salt of the copolymer is an aluminum salt.

14. A composition of matter as in claim 6 wherein the metal salt of the copolymer is an iron salt.

15. A composition of matter comprising an aliphatic hydrocarbon liquid having dissolved therein a thickening quantity, within the range from about 0.05 up to about 10 percent by weight of the liquid, of a metal salt of lipophilic, linear, copolymer of an alkenyl aromatic sulfonic acid monomer and an ethylenically unsaturated aromatic hydrocarbon monomer copolymerizable therewith of the benzene series having from 10 to 18 carbons, said copolymer containing in polymerized form about 0.05 up to about 1.5 of the sulfonic monomers per 100 combined monomer units, said alkenyl aromatic sulfonic acid monomer having the formula:

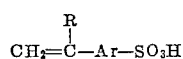

wherein Ar is a divalent radical selected from the group consisting of aromatic hydrocarbon radicals of the benzene series and nuclear halogenated aromatic hydrocarbon radicals of the benzene series, said divalent radicals having from 6 to 18 carbons and their valence bonds on nuclear carbon atoms, and R is a member of the group consisting of hydrogen and methyl, and in which salt of the copolymer the metal cation is selected from the group consisting of mono-, di- and trivalent ions of metals that form salts with at least one of the mineral acids selected from the group consisting of hydrochloric, sulfuric, nitric and chloric acids, which salts are ionizable to provide metal ions that are not subject to spontaneous oxidation or reduction in aqueous media.

16. A composition of matter as in claim 15 wherein the metal salt of the polymeric sulfonic acid is an alkali metal salt.

17. A process for thickening a non-polar, organic solvent having a solubility parameter up to about 10.5 at 25° C. selected from the group of non-polar solvents consisting of aliphatic hydrocarbons, aromatic hydrocarbons, halogenated aromatic hydrocarbons, halogenated aliphatic hydrocarbons, mono-nitro-substituted aromatic hydrocarbons, alkyl and aryl thioethers, carbon disulfide, trialkyl and triaryl esters of phosphoric acid and mixtures of organic solvents comprising a major proportion of at least one solvent of the foregoing classes of non-polar organic solvents, which method comprises mixing with said solvent in any order (A) about 0.05 up to about 10 percent by weight of the non-polar organic solvent of a lipophilic, linear copolymer of an alkenyl aromatic sulfonic acid monomer with a lipophilic, ethylenically unsaturated monomer copolymerizable therewith, said copolymer containing in polymerized form from about 0.05 to about 3 of the sulfonic acid bearing monomers per 100 combined monomer units, said alkenyl aromatic sulfonic acid monomer having the formula:

wherein Ar is a divalent radical selected from the group consisting of aromatic hydrocarbon radicals of the benzene series and nuclear halogenated aromatic hydrocarbon radicals of the benzene series, said divalent radical having from 6 to 18 carbons and their valence bonds on nuclear carbon atoms, and R is a member of the group consisting of hydrogen and methyl, and said copolymer being characterized by a degree of polymerization sufficient to provide an average of at least about two sulfonic groups per 100 combined monomer units, and (B) a sufficient amount of metal cation to cause thickening of the non-polar solvent, said metal cation being selected from the group of mono-, di- and trivalent ions of metals that form salts with at least one of the mineral acids selected from the group consisting of hydrochloric, sulfuric, nitric and chloric acids, which salts are ionizable to provide metal ions that are not subject to spontaneous oxidation or reduction in aqueous media.

18. A method as in claim 17 wherein the metal cation is added to the non-polar solvent as a salt of a weak organic acid in which the anion has a greater affinity for a hydrogen ion than the conjugate sulfonic group of the polymeric sulfonic acid.

19. A method as in claim 17 wherein the metal cation is added to the non-polar solvent in the form of a metal alkylphenolate.

20. A method as in claim 17 wherein the metal cation employed is an alkali metal derived cation.

21. A method as in claim 17 wherein the metal cation employed is an alkaline earth metal derived cation.

22. A process for thickening an aliphatic hydrocarbon liquid which comprises mixing with said hydrocarbon liquid in any order, (A) about 0.05 up to about 10 percent by weight of the hydrocarbon liquid of a lipophilic, linear copolymer of an alkenyl aromatic sulfonic acid monomer and an ethylenically unsaturated aromatic hydrocarbon monomer copolymerizable therewith of the benzene series having from 10 to 18 carbons, said copolymer containing in polymerized form from about 0.05 up to about 1.5 of the sulfonic monomers per 100 combined monomer units, said alkenyl aromatic sulfonic acid monomer having the formula:

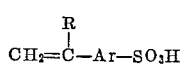

wherein Ar is a divalent radical selected from the group consisting of aromatic hydrocarbon radicals of the benzene series and nuclear halogenated aromatic hydrocarbon radicals of the benzene series, said divalent radicals having from 6 to 18 carbons and their valence bonds on nuclear carbon atoms, and R is a member of the group consisting of hydrogen and methyl, the polymer being characterized by a degree of polymerization sufficient to provide an average of at least about two sulfonic acid groups per 100 combined monomer units, and (B) a sufficient amount of metal cation to cause thickening of the aliphatic hydrocarbon, said metal cation being selected from the group of mono-, di- and trivalent ions of metals that form salts with at least one of the mineral acids selected from the group consisting of hydrochloric, sulfuric, nitric and chloric acids, which salts are ionizable to provide metal ions that are not subject to spontaneous oxidation or reduction in aqueous media.

23. A method as claim 22 wherein the metal cation is added to the non-polar solvent as a salt of a weak organic acid in which the anion has a greater affinity for a hydrogen ion than the conjugate sulfonic group of the polymeric sulfonic acid.

24. A method as in claim 22 wherein the polymeric sulfonic acid has a weight average molecular weight of at least 1 million.

References Cited

UNITED STATES PATENTS

| | | | |
|---|---|---|---|
| 2,283,236 | 5/1942 | Soday | 260—79.3 |
| 2,640,820 | 6/1953 | Teot et al. | 260—79.3 |
| 2,683,137 | 7/1954 | Roth | 260—79.3 |
| 2,733,232 | 1/1956 | Bauman | 260—79.3 |
| 2,809,959 | 10/1957 | Roth | 260—79.3 |
| 3,033,834 | 5/1962 | Roth | 260—79.3 |
| 3,056,766 | 10/1962 | Roth | 260—79.3 |

OTHER REFERENCES

Signer et al.: Preparation and Properties of Polystyrene Sulfonic Acids; "Journal of Chemistry and Physics"; France; 1950; Vol. 47; pp. 704–707.

MORRIS LIEBMAN, *Primary Examiner.*

L. T. JACOBS, *Assistant Examiner.*